April 6, 1965     A. DRITZ     3,176,364
SEPARABLE FASTENER
Filed Oct. 6, 1959     3 Sheets-Sheet 1
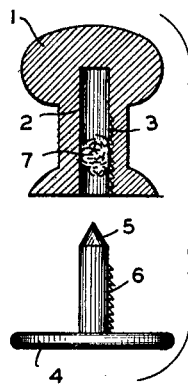
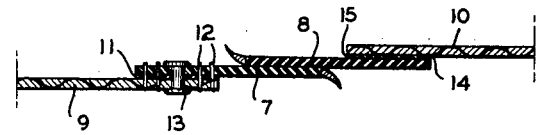
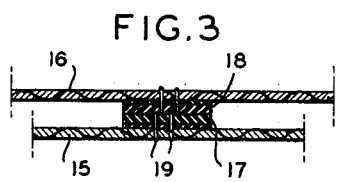
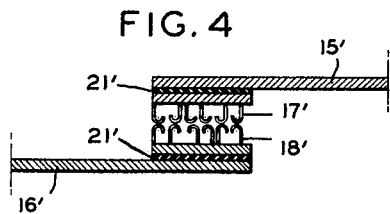
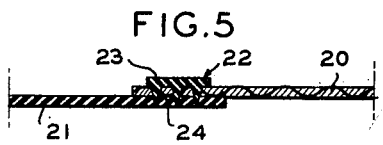
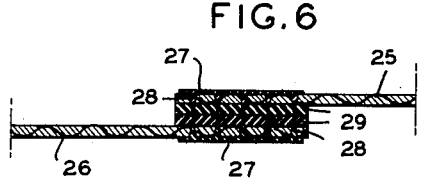
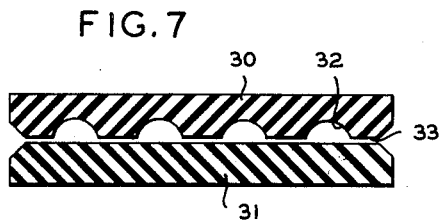
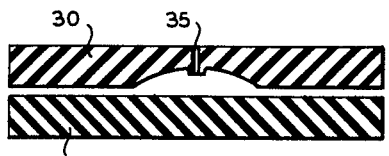
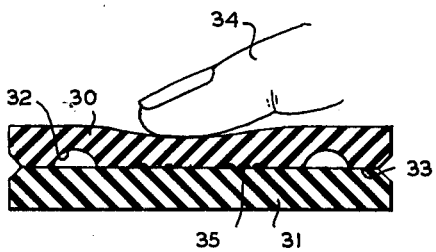
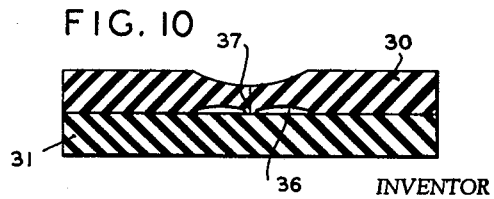
INVENTOR
ARTHUR DRITZ
BY Sol Shappirio
ATTORNEY April 6, 1965   A. DRITZ   3,176,364
SEPARABLE FASTENER
Filed Oct. 6, 1959   3 Sheets-Sheet 2
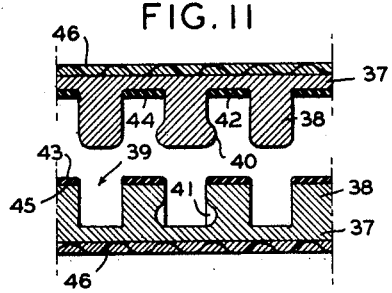
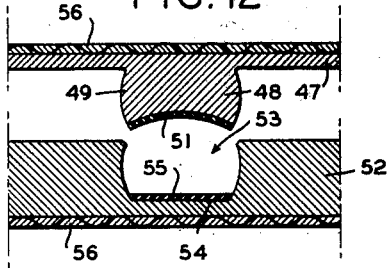
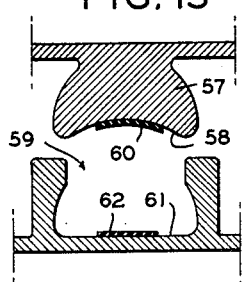
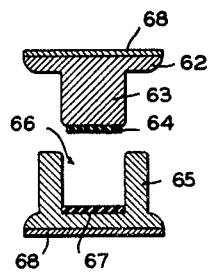
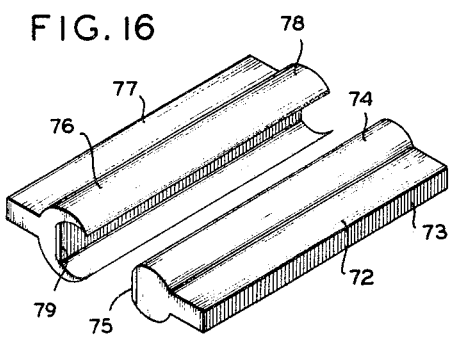
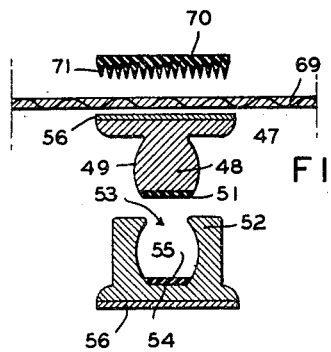
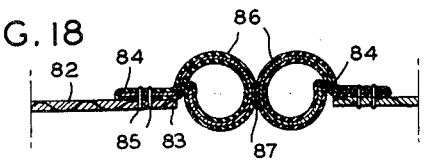
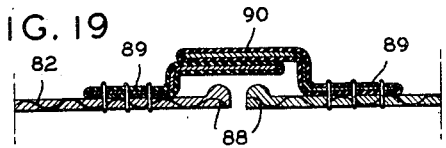
INVENTOR
ARTHUR DRITZ
BY Sol Shappirio
ATTORNEY April 6, 1965 A. DRITZ 3,176,364
SEPARABLE FASTENER
Filed Oct. 6, 1959 3 Sheets-Sheet 3

INVENTOR
ARTHUR DRITZ
BY Sol Shappirio
ATTORNEY 3,176,364
SEPARABLE FASTENER
Arthur Dritz, 1115 Broadway, New York 10, N.Y.
Filed Oct. 6, 1959, Ser. No. 844,743
3 Claims. (Cl. 24—213)

This invention relates to closures particularly in connection with garments or analogous usage and includes garment and other closures in which the degree of tenacity and permanency of the closure may be varied.

Prior art types of closures are usually mechanical in type. Whether one-part or multi-part closures or fasteners are used, and whether of metal or other materials such as plastic, the closure operation depends on mechanical parts that interlock or otherwise mesh together to hold in position. This is true not only of closures such as male and female cooperating members, but as well of zippers and other analogous types of devices, hooked pile fabrics, etc. In all of them, closure is effected by cooperating mechanical parts so that the closure operation as effected, is fixed in character. It is not possible to have closures in such cases in which the sealing or closing effect can be varied with respect to its permanency. The type of closure is thus fixed in structure and permanency, and no variation is possible.

Among the objects of the present invetnion is the production of garment and other types of closures in which the permanency of the closure operation may be controlled so that the intermeshing or interlocking parts or members may be permanently or only releasably locked together.

Other objects include such closures where the parts may be separated and relocked together repeatedly.

Still other objects include such closures which utilize self-sealing plastics to effect such closure operations either of themselves or in combination with mechanical interlocking features.

Still further objects and advantages of the present invention will appear from the more detailed disclosure set forth below, it being understood that this more detailed disclosure is given by way of illustration and explanation, and not by way of limitation, since various changes may be made therein by those skilled in the art without departing from the scope and spirit of the present invention.

The drawings in connection with that more detailed description, show the following:

FIGURE 1 is an exploded elevation of a two-part fastener embodying the present invention.

FIGURE 2 is a vertical section through a closure embodying the present invention.

FIGURE 3 is a vertical section through a modified form of the present invention.

FIGURE 4 is a vertical section through a form of the present invention including a hooked pile member utilized as one member of a two-part closure embodying the present invention.

FIGURE 5 is a vertical section of a further modification of the present invention.

FIGURE 6 is a further application of the invention of FIGURE 5.

FIGURE 7 is a vertical section through a further modification.

FIGURE 8 shows the closure of FIGURE 7 in closure engaging position.

FIGURE 9 is a vertical section through a modified form of FIGURE 7.

FIGURE 10 shows the closure of FIGURE 9 in closure-engaging position.

FIGURE 11 is a vertical section of another type of closure.

FIGURE 12 is a vertical section through a different application of the invention of FIGURE 11.

FIGURE 13 is a vertical section through another modification of the invention illustrated in FIGURE 12.

FIGURE 14 is a further modification.

FIGURE 15 is a vertical section of a modification of the invention illustrated in FIGURE 14.

FIGURE 16 is a perspective view of a two-part zipper-simulating closure of the present invention.

FIGURE 17 is a perspective view of a further form of the invention.

FIGURE 18 is a vertical section through a modification utilizing the invention of FIGURE 17.

FIGURE 19 is a vertical section through a further modification of FIGURE 18.

Figure 20:
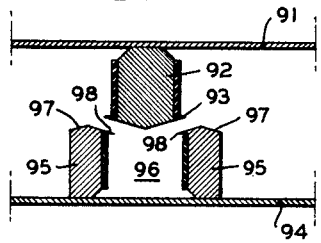
FIGURE 20 is a vertical section through an additional modification.

In accordance with the present invention, fasteners or closures for garments and for other purposes are produced from intercommunicating elements held together in intermeshing or interlocking position by means of fusible silicone rubber between said elements to bind them together. The intercommunicating elements may or may not employ physical elements to hold them together, but in either case such bond is secondary to that obtained by use of the fusible silicone rubber.

Since the fusible silicone rubber can be obtained on the market in several different modifications, it is readily available for employment for the purposes set forth herein. Such fusible silicone rubbers are pressure sensitive and the surfaces adhere to themselves or to other silicone rubbers. The adhesive quality is built into the fusible silicone rubber and may be controlled without sacrifice of processing or other desirable properties. The fusible silicone rubbers are obtainable in grades so that under pressure they will adhere adequately but may nevertheless be separated, the bond not being permanent. On the other hand, they are also obtainable so that once pressure fused together, a permanent bond is obtained. They thus exhibit a great variety of properties for use in the present invention. As exemplary of commercially available fusible silicone rubber mention may be made of Union Carbide "K–1605 R" and "K–1605 RS." Such materials may be used for any of the purposes set forth herein. The fusible silicone rubbers may be applied as a coating or deposit or may be formulated into sheet or other forms and employed in that condition.

The invention may take such a multiplicity of forms, that it may be adapted to many a desired use. The following will accordingly be illustrative and reference will be made to the drawing in further explaining the invention.

Referring to FIGURE 1, this represents a more or less conventional form of two-part fastener in which two intercommunicating elements are used. 1 is a female element having elongated passageway 2 which latter may have indentations 3. Male element 4 has shank 5 adapted to be inserted into passageway 2, element 4 desirably having prongs or projections 6 adapted to enter into indentations 3. In order to utilize the features of the present invention, a glob or small ball of fusible silicone rubber 7 may be inserted in passageway 2 in the path of shank 5. The position of the fusible silicone rubber will have an effect on the type of joint obtained. If the glob of fusible rubber is placed at the extreme inner position, it will not be penetrated until the shank is moved into its innermost position. Intermediate positions will not give sealing.

Thus when elements 1 and 4 are intermeshed, a rigid association of parts is obtained. The fusible silicone rubber gives control over the type of joint obtained. If such rubber is of the permanently pressure sensitive type, a secure joint will be obtained that will be separable when desired. If the fusible silicone rubber is one that sets to a non-fusible condition, a permanent joint may be obtained. There are possibilities of intermediate values and properties for the fusible silicone rubber which will thus determine the type of interlocking joint that is obtained. Fasteners of the snap type or garment closures of this character are of wide use as in home dressmaking and for garment closures of any type.

The principles of this invention may be applied as illustrated in FIGURES 2 and 3. In FIGURE 2, the sealing of adjacent cloth sheets is shown. Here the garment closure may consist of intercommunicating elements each of which 7 and 8 is a sheet of fusible silicone rubber attached to cloth 9 and 10 respectively. The sheet of fusible silicone rubber may be attached to its adjacent cloth or textile sheet by heat sealing or by sewing, rivets, eyelets, staples, etc. Thus at 11, sheet 7 may be attached to textile 9 by sewing 12 or by rivet 13 or by both. Or for heat sealing as at 14, an intermediate sheet or strip 15 of thermoplastic material may be inserted between overlapping ends of sheets 8 and 10 where, upon application of heat and pressure as by a home pressing iron, the materials will be sealed together. Thermoplastic sheets that may be used for heat sealing include a multiplicity of materials such as "zytel," "nylon," "vinyl," etc. Any material which bonds fusible silicone rubber to cloth may be used. The overlapping edge portions of fusible silicone rubber sheets 7 and 8 will bond together under finger pressure to give a sealed closure. This may be pulled apart to open the closure and resealed together many times. To prevent the ends of the silicone rubber from bonding together, tubes 7' and 8' of non-fusible non-pressure sensitive material may be used along the edges of sheets 7 and 8 to facilitate peeling or separating of the fusible silicone strips.

In an analogous manner as shown in FIGURE 3, two cloth materials 15, 16 may be joined together. A fusible silicone rubber button 17, 18 may be individually attached to its adjacent cloth 15, 16 by securing 19 or in any other way enumerated above under FIGURE 2. By compressing the fusible silicone rubber buttons 17 and 18 together, the seal may be effected. A line of such fusible silicone rubber buttons may be used to produce a closure, or silicone rubber strips may be used to give a continuous strip closure.

As shown in FIGURE 4, two cloth materials 15' and 16' carrying hooked pile elements 17' and 18' respectively cemented at 19' and 20' to the cloth materials may be used in the present invention. Before the hooked pile elements are secured together, a small amount of fusible silicone rubber 21' may be inserted to flatten out between the sheets and hold them securely together. The hooked pile elements are of conventional type now readily available on the market in which one member has a hooked pile 15' while the other is either looped or hooked pile 16'. Upon pressure contact they hold together but may be separated. The degree of adhesion may be controlled by the present invention utilizing the silicone rubber in combination with the hook and loop members as explained above.

In the form of the invention shown in FIGURES 5 and 6, layers of cloth and fusible silicone rubber may be bonded together by fusible silicone rubber pronged members. If at least one of the layers is of fusible silicone rubber, this may be sealed to a cloth member by a pronged fusible silicone rubber element. If two cloth members are to be sealed together, then desirably two pronged members are used. In FIGURE 5, cloth 20 is bonded to fusible silicone rubber sheet 21 by a pronged member 22 having flat portion 23 from which prongs 24 pass through both cloth 20 and silicone rubber sheet 21. The prongs may be either of fusible silicone rubber or may consist of metal prongs covered with fusible silicone rubber. In either case the prongs penetrate the layers or sheets to be bonded, and the fusible silicone rubber prongs 24 fuse with the silicone rubber sheet 21 to bond cloth layer 20 between flat portion 23 of the pronged member and fusible rubber sheet 21.

A similar structure is shown in FIGURE 6 where, however, two pieces of cloth 25, 26 are bonded together. Each cloth carries at or along its edge, pronged member 27, one such member penetrating its respective cloth layer so that prongs 28 enter and fuse with its adjacent fusible silicone rubber strip 29. In this way each cloth carries along its margin a silicone rubber strip 29 which under pressure fuse together to give a closure or bond. Such types of closures as those shown in FIGURES 5 and 6 have wide utility in dressmaking or in joining members of cloth, textile or other materials together.

In the form of the invention illustrated in FIGURES 7 and 8, two sheets 30 and 31 of fusible silicone rubber may be used, one of the sheets 30 having depressions 32 that may be hemispherical and in surface 33 in contact with lower layer 31. When pressure is applied as by a finger 34, the depressions will be forced to collapse or contract as shown at 35 so that depressions 32 act as suction cups causing additional fusible material to come into contact with lower layer 31 of fusible silicone material to give increased layer contact as well as suction cup action. This form of the invention is particularly useful to form closures by strips of contacting fusible silicone rubber along edges of cloth to be bonded to closure formation and in which the permanency of the bond may be controlled as explained above.

FIGURES 9 and 10 are similar to the form shown in FIGURES 7 and 8 except that some or all of the depressions are provided with vents 35. When pressure is applied to collapse a suction cup, air may escape through vent 35 to permit the upper layer to contact the lower layer and produce more ready and positive action than when no vent is supplied. Actually, the pressure may be directed to form as shown in FIGURE 10, two smaller cups 36 which may be permitted to remain with separating wall 37 between them, sealing the cups, wall 37 being forced into contact with layer or sheet 31.

Another modification is that shown in FIGURE 11 in which each element consists of sheet 37 having a series of projections 38 forming depressions 39 between them, the projections of one sheet intermeshing with the depressions of othe other. Each sheet may be made of any type material but preferably is not fusible silicone rubber, and is of a non-fusible rubber, silicone or otherwise so that upon pressure contact, the sheets do not seal together although the projections and depressions may as shown be conformed to give close contact. By expanding the projections to a bulbous form as shown at 40 and giving the depressions a corresponding recess as illustrated at 41, the sheets will interlock but may be separated, in the absence of any means to fuse them together. By applying a layer 42 of fusible silicone rubber at the innermost face 44 of depression 39, and a similar layer 43 at the outermost portion 45 of projection 38, when the sheets are interlocked, fusible silicone rubber layers will contact to seal by fusion action. Desirably each element 37 has a heat sealed layer 46 of zytel, nylon, etc., bonded to the non-fusible silicone rubber sheet 37 which readily enables cloth to be attached by heat and pressure to sheets 37 so that such articles may be used for garment closures. For such purposes, sheets 37 may be strips readily attached to cloth through heat sealing layer 46.

In FIGURE 12, the fastener or closure has one element in the form of plastic disc or strip 47 desirably of non-fusing rubber or other pressure non-sensitive material with projection 48 extending angularly therefrom carrying expanded or bulb-shaped end portion 49 desirably provided with outer concave face 50 and a layer 51 of fusible silicone rubber, the concavity producing a suction grip when compressed. The other intercommunicating element is cup-shaped member 52 having enlarged depression 53 for reception of projection 48, and conforming thereto so that close, intimate contact is obtained. Depression 53 desirably has flattened bottom portion 54 on which layer 55 of fusible silicone rubber is applied so that when elements 48 and 52 are in intimate contact, they are not only intimately gripped together, but are interlocked in sealed relation through the action of fusion of the silicone rubber layers with increased effect due to the suction cup configuration. Such intercommunication elements are well adapted to form garment closures or other joints for which purpose each of the elements may be mounted on heat sealing layer 56 as explained above for other species of the invention. Layers 56 in the form of buttons, sheets, strips, etc., carrying one or more of such closure producing members, may be utilized.

The form of invention shown in FIGURE 13 is analogous to that of FIGURE 12, except that projection 57 carries deeply concave face 58, while depression 59 is flat. When the elements are assembled, projection 57 with its layer 60 of fusible silicone rubber will not contact bottom 61 of depression 59, the latter having layer 62 of fusible silicone plastic. The parts will therefore still be separable, since they are held together by mechanical interlocking only. To get fusion sealing, projection 57 must be pressed down firmly to expand until the fusible silicone layers come into pressure sealing contact.

In FIGURE 14, one of the intercommunicating elements is a disc or button 62 of non-fusible silicone rubber or other flexible rubber material having projection 63 on the end of which is a layer 64 of fusible silicone rubber. The other intercommunicating element is cup-shaped member 65 having depression 66 for snug reception of projection 63, the parts being designed to obtain a squeeze interlocking engagement, so that pressure between them holds them together. At the bottom of depression 66, is layer 67 of fusible silicone rubber, so that the parts adhere through silicone rubber pressure sensitive layers 64 and 67. As in other analogous forms, each of elements 62 and 65 is desirably provided with layer 68 of heat sealing material such as nylon etc. Such layer 68 may be in the form of buttons, sheets, strips etc. carrying one or more of such closure members and used as intercommunicating elements for garment closures or for other purposes as by attachment to fabric or in any other way.

The form shown in FIGURE 15 is similar to that of FIGURE 12 with the addition that cloth or textile 69 may be attached to button or disc 49 carrying layer 56 of heat sealing material by means of pronged member 70 having prongs 71 of fusible silicone rubber as described above for FIGURES 5 and 6 and utilized in the same way.

A form of the invention which gives a "zipper" type closure effect is shown in FIGURE 16. For this purpose one of the intercommunicating elements is elongated member 72 in cross-section having web-like projection 73 with cylindrical expanded portion 74 carrying a fusible silicone rubber layer 75 along the outer edge of cylindrical portion 74. The other element is also in the form of an elongated member 76 with web 77 and in cross-section cup-shaped web-like projection 78 adapted to receive expanded portion 74 on elongated member 72 so that the parts fit snugly. Cup-shaped projection 78 has within it layer 79 of fusible silicone rubber or similar pressure-responsive material so that the parts when assembled produce a pressure seal at contact of the fusible silicone rubber layers. Webs 73 and 77 may be used for attachment of the respective element to the edge of cloth or textile members so that they cooperate to produce a continuous garment closure or for other purposes.

Another form of the invention is shown in FIGURE 17 where the intercommunicating elements are produced from flexible flat metal core or lining or foil 80 coated with layers of fusible silicone rubber coating 81. The lining or core is desirably of lead, aluminum, lead-tin alloys, etc. which may be formed readily to a desired shape that will be retained. Thus in FIGURE 18 of two pieces of cloth 82 each carries along an edge 83 a fusible silicone rubber coated flexible metal core 84 of the type shown in FIGURE 17 stitched at one end by stitching 85 to cloth 82, the other end of the coated foil member in each case being formed into tubular extension 86, the tubular members being in pressure contact at 87 to give a closure. Contacting extensions 86 may take any desired form.

Thus as shown in FIGURE 19, cloth members 82 having juxtaposed beaded edge 88 each carries an intercommunicating element of the type shown in FIGURE 17, formed to give binding strips 89 each attached at or near edge 88, with each strip offset at 90 to overlie beaded edges 88, the overlapping portions being in pressure sealed contact due to the pressure sensitive coatings.

In connection with garment of other closures or any utilization to which the present invention may be put, it has been found that most effective bonding action is obtained by the use of fusible silicone rubber, if the contacting surfaces of the latter are reasonably clean. Dust, lint, or other foreign substances on the pressure-sealing surfaces weakens or may interfere with, closure sealing. It is desirable, therefore, to provide built-in structures of simple but effective character to shelter or protect the pressure sensitive layers from deposition of such interfering substances, or to remove such substances automatically but simply if they have been deposited. Effective structures for this purpose are shown below.

Referring to FIGURE 20, sheet material 91 which may be cloth, thermoplastic, synthetic textile, etc., carries projecting web 92 angularly thereto, preferably at right angles, the outer edge of web 92 having in cross-section barbed head 93, while second sheet 94 of any of the materials mentioned above, carries two desirably parallel webs 95 forming channel 96 for snug reception of web 92 therebetween, each end 97 of webs 95 in cross-section showing an internally directed barb 98 so that when web 92 is moved into position between webs 95, the barbs on head 93 will scrape along the side walls of webs 95, while at the same time, the barbs 98 on webs 95 will scrape along the walls of web 92. If the inner side walls of webs 95 and the walls of web 92 carry fusible silicone rubber coatings, the scraping or sweeping actions of the barbs will clean those coatings from any lint etc. present, to enable insured sealing to take place by close pressure contact of the coatings.

Figure 22:
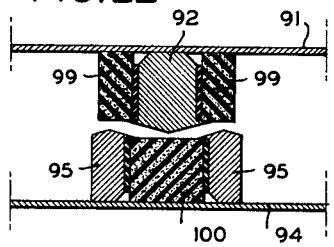
FIGURES 22 and 23 are respectively similar to FIGURES 20 and 21 in a modified form of the latter.
Figure 21:
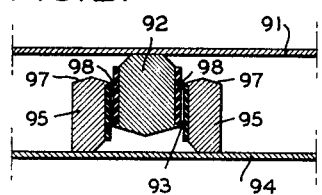
FIGURE 21 is a section through the modification of FIGURE 20 showing the parts in interlocked position.
Figure 23:
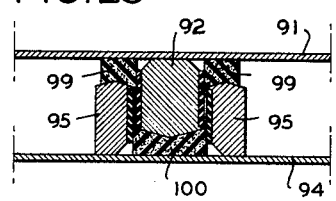

The form shown in FIGURES 22 and 23 utilizes structures identical with those shown in FIGURES 20 and 21, but in addition the layers of fusible silicone rubber on web 92 are protected by collapsible sponge rubber 99 or similar material. If web 92 is cylindrical, sponge rubber or other material 99 may be tubular and surround web 92, the barb 93 being sufficient to hold the sponge rubber in position. If web 92 is elongated, sponge rubber 99 may be sheets of material mounted on sheet 91. Between webs 95, 95 sponge rubber, or other sponge material, insert 100 may be placed and either mounted on sheet 94, or merely fitted in shape and size to be held between webs 95, 95 by barbs 98, 98. Such sponge rubber or similar inserts will protect the layers of fusible silicone rubber against dirt, lint, etc. deposits. Upon assemblage of the two intercommunicating elements of the closure or fastener, the pressure of the webs will collapse the sponge rubber inserts to give sealing of the fusible silicone layers by pressure contact.

Figure 24:
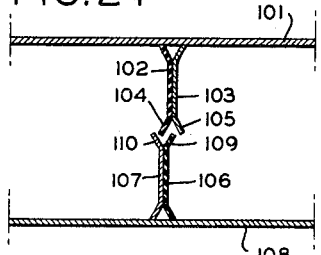
FIGURE 24 is a further modification in vertical section of the invention of FIGURE 20.
Figure 25:
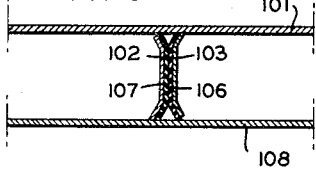
FIGURE 25 is the interlocked form in vertical section of the device of FIGURE 24.

A modified form of layer protection may be utilized as shown in FIGURES 24 and 25. In this form, sheet material 101 carries projecting flexible fusible silicone rubber web 102 at an angle, preferably right angles thereto in non-sealing juxtaposition with flexible non-fusible thermoplastic web 103 also carried on sheet 101 and projecting angularly thereto and closely adjacent to web 102, the webs being of materials that do not adhere; outer ends 104, 105 respectively of webs 102, 103 are turned outwardly to act as a guide into the space between webs 102, 103 when the latter are separated. A similar pair of webs 106, 107 like webs 102, 103 are shown carried on sheet material 108, except that the position of the fusible rubber web 106 is on the opposite side from that of the non-pressure sensitive web 107. Here again, the outer ends 109, 110 of webs 106, 107 are turned outwardly to guide an inserted web into position between webs 106, 107. The non-fusible webs protect the inner faces of the fusible webs from accumulation of debris of any kind. Now if the two sets of webs are urged toward each other with each fusible silicone rubber web entering between the opposing pair of webs, as shown in FIGURE 25, the protected clean surfaces of fusible rubber in pressure contact will cause sealing and actually the non-fusible webs will increase the pressure of the fusible webs against each other to insure sealing contact.

Figure 26:
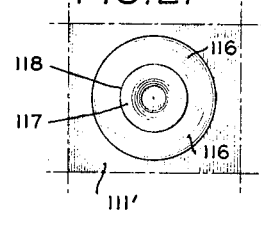
FIGURE 26 is a further modification of the invention in vertical exploded section, and FIGURE 27, a top plan view thereof.

In the form shown in FIGURE 26, the two-part closure includes one intercommunicating element wherein disc or button 111 carries bi-conical projection 112 sealed at 112' to button 111 which has layer 113 of fusible silicone rubber on a conical surface 114. The latter may be protected by a thin rubber wall 115 which may collapse or open outwardly as explained below. The other intercommunicating element is in the form of sheet 111' mounting a hollow conical shell 116 composed of four or other number of leaves or shell-forming elements, shell 116 in size being adapted to receive bi-conical projection 112 within the shell in close contiguity. The outer lips 117 of the shell-forming elements are turned outwardly at ends 118 so that when the elements are urged together, the outer end 119 of projection 112 will enter between ends 118 and force the latter outwardly to receive projection 112 so that the latter will enter within shell 116 and in final position shell 116 will closely engage projection 112. During this operation, thin rubber wall 115 will be collapsed to permit close contact of projection 112 with shell 116. The latter is provided with layer 119 of fusible silicone rubber so that the close contact in final position of shell 116 and projection 112 will give self-sealing pressure on the silicone rubber layers.

The projection is not limited to conical form, but may be pyramidal or other form with which the shell may conform as in configuration to receive the projection in close pressure contact.

Figures 27, 28:
FIGURE 28 is a side elevation of a further modified form of the invention.
Figures 29, 30:
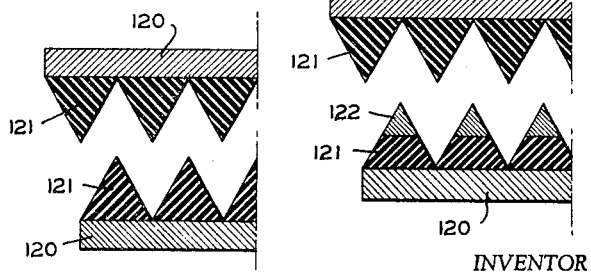
FIGURE 29 is an enlarged fragmentary detail of the form of FIGURE 28.
FIGURE 30 is a modification of the device of FIGURE 28.

In the form shown in FIGURES 28 and 29, the intercommunicating elements each consist of sheet or strip 120 of non-fusing heat-responsive thermoplastic carrying a sheet of fusible silicone rubber having a series of fusible silicone plastic prongs 121, the prongs of one sheet being adapted to intermesh with those of the other in close pressure contact. Desirably, tips 122 of prongs 121 on at least one of the sheets are coated with non-fusible thermoplastic or other material that will not seal with the fusible silicone rubber so that the prongs will be able to intermesh a predetermined distance before sealing pressure begins to come into effect. The structure is well illustrated in enlarged fragmentary elevation in FIGURE 29.

In FIGURE 30, the elements are the same in configuration as in FIGURES 28 and 29, but the fusible silicone rubber prongs are of a slow or delayed fusing material which permits intermeshing of the parts without resistance and by self-sealing action, no layer of fusible silicone plastic being necessary in this form.

Figure 31:
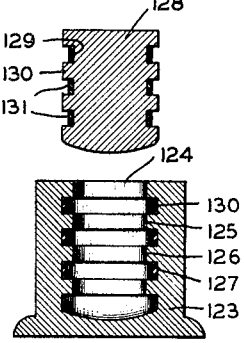
FIGURE 31 is a further form of the invention in exploded vertical section.

In FIGURE 31, the intercommunicating elements consist of base member 123 having passageway 124, the inner walls 125 of which have alternating annular ridges 126 and depressions 127 while the other intercommunicating element is member 128 of a size to fit snugly within passageway 124, member 128 having alternating annular depressions 129 and ridges 130 adapted to intermesh with annular ridges 126 and depressions 127 when the parts are in inter-engagement, at least one of the members being sufficiently flexible to permit such interengagement. At least some of the depressions carry layers 131 of fusible silicone rubber to secure the members together in assembled position in addition to any mechanical interlocking effect.

In connection with the use of fusible silicone rubber and other plastic and thermoplastic materials in any of the forms and applications set forth above, such materials may also be used when they have incorporated within them a magnetic powdered metal or magnetic powdered ceramic material. Thus the fusible silicone rubber compounded with a sufficient amount of powdered magnetic powder, whether metallic or ceramic may be used above in lieu of conventional fusible silicone rubber in any of the utilizations where the latter is referred to above. The amount of magnetic powder employed is sufficient to give the desired magnetic effect. It should be less than will interfere with the pressure sensitive silicone rubber function. But the amounts may vary substantially. And since plastic materials carrying such magnetic powders are available on the market, the magnetized plastic materials may be used where available commercially, for substitution of non-magnetized materials referred to above, or the same amounts of magnetic powders now used commercially may be incorporated into fusible silicone rubbers or other plastics and used in lieu of the non-magnetic rubbers or other plastics. Since, in general in accordance with the present invention the garment and related closures use fusible silicone rubber or at least two intercommunicating elements, the substitution of magnetized fusible silicone rubber on two such elements or members will give self-centering as well as self-sealing functions.

In lieu of silicone rubber, the present invention may make use of any type of sheet material which on pressure contact adheres together securely. Uncured rubber sheets may be used in this way. Where the pressure sensitive sheet materials after pressure contact are separable, a temporary joint is secured. Where the joint is not separable, a permanent joint is obtained.

Having thus set forth my invention, I claim:

1. A two-part fastener for garments and the like consisting of a garment, separate intercommunicating elements each attached to a different part of a garment and a pressure sensitive bond of fusible silicone rubber between said elements to bind them more securely but releasably together, in which one of the intercommunicating elements is a plastic disc having a projection carrying an expanded end portion having an outer concave face carrying some of the stated fusible pressure-sensitive silicone rubber, and the other of the intercommunicating elements is a cup-shaped member having an enlarged depression for reception of the expanded end portion on the projection, the depression having as a layer therein some of the fusible pressure-sensitive silicone rubber at the base of the depression, whereby on pressure contact the elements interlock and also pressure seal at the fusible silicone rubber contacts.

2. The fastener of claim 1, in which each element has an outer flat face different from the plastic disc and cup shaped members respectively and carrying adherent thereto a pressure sealing thermoplastic layer.

3. The fastener of claim 1 in which the outer concave face of the projection is a deeply entrant concave portion in which the fusible silicone rubber does not contact the fusible silicone rubber layer in the depression except under extraordinary pressure whereby sealing with fusible silicone bond may be obtained.

References Cited in the file of this patent

UNITED STATES PATENTS

| | | |
|---|---|---|
| 1,222,678 | Savage | Apr. 17, 1917 |
| 1,661,537 | Knapp | Mar. 6, 1928 |
| 1,722,056 | McComb | July 23, 1929 |
| 2,147,817 | Johnson | Feb. 21, 1939 |
| 2,557,434 | Hoverder | June 19, 1951 |
| 2,601,337 | Smith | June 24, 1952 |
| 2,627,097 | Ellis | Feb. 3, 1953 |
| 2,655,195 | Curtis | Oct. 13, 1953 |
| 2,658,246 | Mahler | Nov. 10, 1953 |
| 2,756,172 | Kidd | July 24, 1956 |
| 2,789,155 | Marshall et al. | Apr. 16, 1957 |
| 2,816,340 | Domenech | Dec. 17, 1957 |
| 2,841,848 | Smith | July 8, 1958 |

FOREIGN PATENTS

| | | |
|---|---|---|
| 556,942 | Canada | May 6, 1958 |
| 740,573 | Great Britain | Nov. 16, 1955 |